Sept. 30, 1924.  
R. A. McCARTY  
BEARING COOLING DEVICE  
Filed Feb. 20, 1922  
1,509,964  
2 Sheets-Sheet 1

WITNESSES:

INVENTOR
Roy A. McCarty.
BY
ATTORNEY

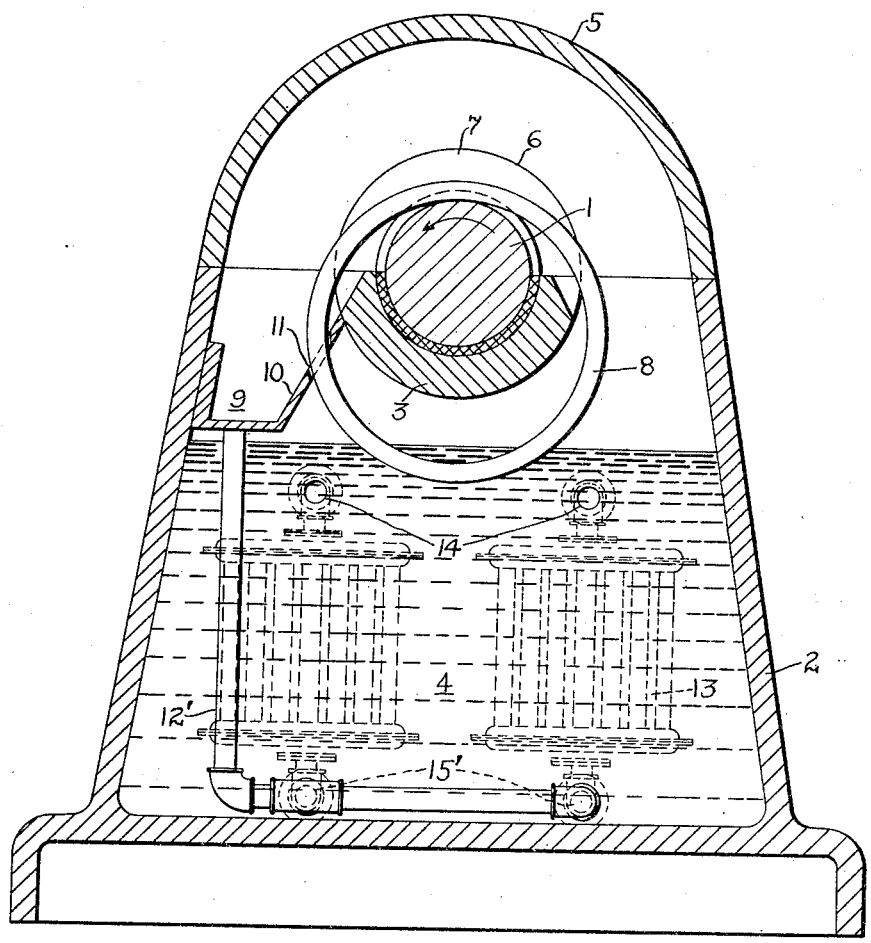

Patented Sept. 30, 1924.

1,509,964

UNITED STATES PATENT OFFICE.

ROY A. McCARTY, OF WILKINSBURG, PENNSYLVANIA, ASSIGNOR TO WESTINGHOUSE ELECTRIC & MANUFACTURING COMPANY, A CORPORATION OF PENNSYLVANIA.

BEARING-COOLING DEVICE.

Application filed February 20, 1922. Serial No. 537,670.

*To all whom it may concern:*

Be it known that I, ROY A. MCCARTY, a citizen of the United States, and a resident of Wilkinsburg, in the county of Allegheny and State of Pennsylvania, have invented a new and useful Improvement in Bearing-Cooling Devices, of which the following is a specification.

My invention relates to bearings and it has particular relation to cooling means therefor.

Heretofore it has been customary to cool the bearings of relatively heavy machines by either circulating the lubricant through the heated parts of the bearings or by circulating cooling water adjacent thereto. In either instance, relatively expensive and cumbersome pump mechanisms must be provided to cause the circulation of the cooling mediums.

One of the objects of my invention is to provide a cooling system of the radiator type adapted for use in connection with bearings and through which the lubricant will be caused to effectively circulate automatically, without the necessity of additional pump mechanism.

Another object of the invention is to provide a cooling system in which the heated lubricant discharged from the bearing will be conveyed either to a point adjacent to the lower portion of the reservoir, whereby the oil at the top of the reservoir, which is supplied to the bearing, may be as cool as possible, or the heated lubricant may be conveyed to the lower portion of a radiator through which it may rise.

In the accompanying drawings,

Fig. 3 is a view similar to Fig. 1, showing a modification.

Figure 1:
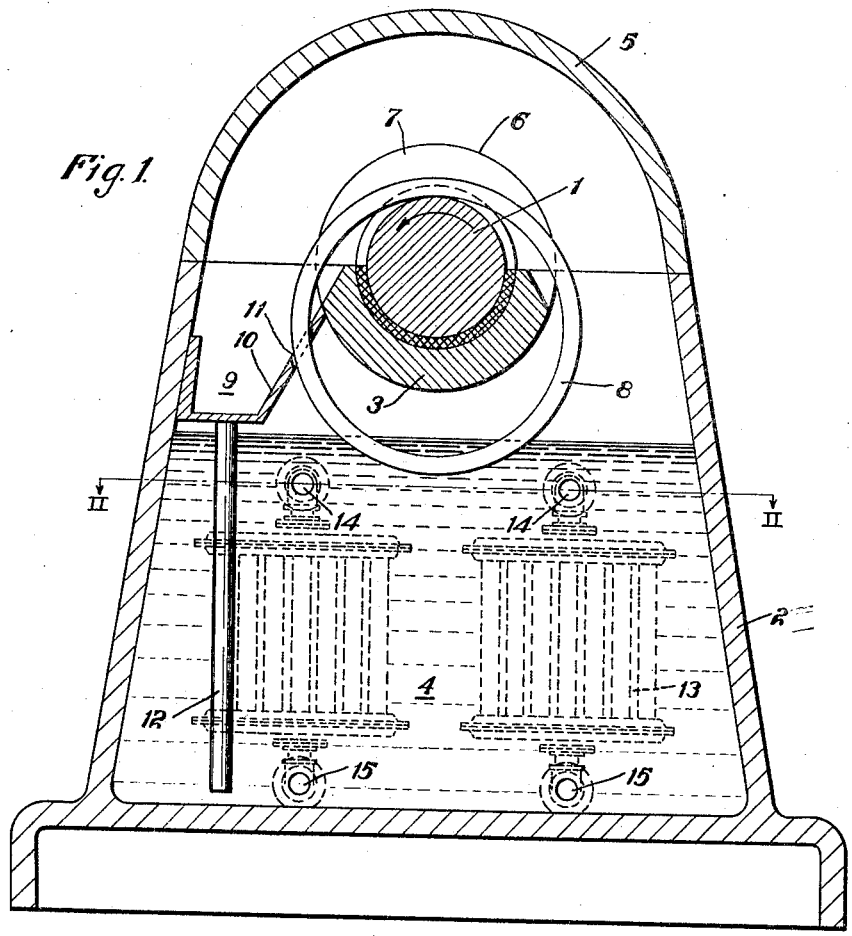
Fig. 1 is a vertical transverse sectional view through a bearing provided with a cooling device constructed in accordance with my invention.
Figure 2:
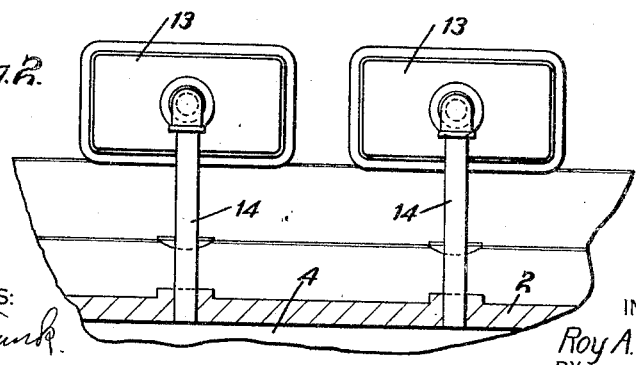
Fig. 2 is a horizontal sectional view taken on line II—II of Fig. 1 and illustrating a portion of the cooling devices in plan view.

Referring to the drawings, a shaft 1 is mounted in a bearing which is illustrated as comprising a pedestal 2 which carries the lower bearing element 3. The pedestal 2 is hollow and provides a reservoir 4 which is adapted to contain the bearing lubricant. The upper portion of the pedestal 2 is provided with a cap 5 which carries the upper bearing element 6 and, by the removal of which, access may be obtained to the interior of the reservoir.

The upper bearing element 6 is provided with a slot 7 within which an oiling ring is movably disposed in operative engagement with the shaft 1. The lower portion of the ring 8 is submerged in the lubricant contained in the reservoir 4 and conveys the same to the shaft 1 by the rotation thereof in the usual manner.

A receptacle 9 is provided adjacent to the lower bearing element 3 and above the level of the lubricant contained in the reservoir 4 and is formed with an inclined side wall 10 which extends to a point adjacent to the slot 7. The inclined wall 10 is provided with an aperture 11 through which the ring 8 may move with the rotation of the shaft 1. Inasmuch as the heated oil discharged from the bearing will have the tendency to remain upon or near the surface of the oil contained in the reservoir if permitted to flow into the same directly, a pipe 12 is provided which communicates with the bottom of the receptacle 9 and which extends in a downward direction, through the lubricant, to a point adjacent to the bottom of the reservoir 4.

As the shaft 1 rotates in its bearing, in the direction indicated by the arrow in Fig. 1, the ring 8 will also rotate and convey lubricant from the reservoir 4 to the shaft from which it will both flow down the side 10 and into the receptacle 9 and be carried thereto by the ring 8. The heated lubricant collected in the receptacle 9 will gravitate through the pipe 12 to the bottom of the reservoir 4, thereby preventing the accumulation of the heated lubricant at the top of the reservoir where the oil ring 8 dips in.

In order that the lubricant in the chamber 4 may be cooled, there are provided a plurality of air-cooled radiators 13 which are mounted on the side of the pedestal 2 and exterior to the reservoir 4.

The radiators 13 may be of any preferred type and communicate with the reservoir 4 through upper and lower pipes 14 and 15, respectively, whereby the lubricant in the radiators is cooled by radiation to the air, and the cooled lubricant flows down, through the pipes 15, into the reservoir 4. In lieu of the construction hereinabove described, it may be desirable, in order to facilitate the circulation of the lubricant, to connect the lower pipes 15′ of the radiators directly to the lower extremity of the pipe 12′, as illustrated in Fig. 3. In this case, the heated lubricant conveyed to the bottoms of the radiators by means of the pipe 12′ is forced upwardly therethrough, by gravity feed, and discharges into the reservoir 4, through the upper pipes 14, after having been cooled in the raliators.

By this construction, a constant supply of relatively cool lubricant may be conveyed to the heated portion of the bearings without the necessity of the expensive pump mechanism heretofore employed for this purpose.

I claim as my invention:

1. A bearing cooling device comprising a bearing, a substantially horizontal shaft co-operating therewith, a reservoir adapted to contain a body of lubricant, substantially below the plane of the shaft, and self actuated circulating means for cooling the lubricant contained in said reservoir.

2. A bearing cooling device comprising a bearing, a substantially horizontal shaft co-operating therewith, a reservoir adapted to contain a body of lubricant below the shaft, means for conveying the lubricant from said reservoir to said shaft, and a gravity-actuated circulating radiator in communication with said reservoir adapted to cool the lubricant contained therein.

3. A bearing cooling device comprising a bearing, a shaft co-operating therewith, a reservoir adapted to contain a lubricant normally out of contact with said shaft, means for conveying said lubricant from said reservoir to said shaft and bearing, and a lubricant-circulating radiator in communication with said reservoir adapted to cool the lubricant contained therein.

4. A bearing cooling device comprising a pedestal having a reservoir therein adapted to contain a lubricant, a bearing carried by said pedestal out of contact with the lubricant in said reservoir, means for conveying lubricant from said reservoir to said bearing, and self-actuated circulating means for cooling the lubricant contained in said reservoir.

5. A bearing cooling device comprising a pedestal having a reservoir therein adapted to contain a liquid lubricant, a bearing carried by said pedestal out of contact with the lubricant in said reservoir, means for conveying lubricant from only the top portion of said reservoir to said bearing, and a lubricant-circulating radiator mounted on said pedestal and in communication with said reservoir and adapted to cool the lubricant contained therein.

6. A bearing cooling device comprising a pedestal having a reservoir therein adapted to contain a lubricant, a bearing carried by said pedestal out of contact with the lubricant in said reservoir, means for conveying lubricant from only the upper portion of said reservoir to said bearing, and means for conveying the heated lubricant away from said bearing to a point adjacent to the bottom of said reservoir.

7. A bearing cooling device comprising the combination, with a bearing, of a pedestal having a reservoir therein adapted to contain a body of lubricant beneath said bearing, means for conveying lubricant from only the upper portion of said reservoir to said bearing, means for conveying heated lubricant away from said bearing to a point adjacent to the bottom of said reservoir, and a gravity-actuated lubricant-circulating radiator mounted on said pedestal and in communication with said reservoir and adapted to cool the heated lubricant contained therein.

8. A bearing cooling device comprising a pedestal provided with a reservoir therein, a body of lubricant in said reservoir, a bearing carried by said pedestal and adapted to support a substantially horizontal shaft above said reservoir, means for conveying lubricant from only the top of said body of lubricant to said bearing, means for collecting the heated lubricant discharged from said bearing, and means for conveying the lubricant thus collected to a point adjacent to the bottom of said reservoir.

9. A bearing cooling device comprising a pedestal provided with a reservoir therein, a body of liquid lubricant in said reservoir, a bearing carried by said pedestal and adapted to support a substantially horizontal shaft above the top level of said body of lubricant, means for conveying lubricant from only the top portion of said body of lubricant to said bearing, a receptacle disposed adjacent to said bearing above the top of said body of lubricant and adapted to collect heated lubricant from said bearing, and means for conveying the lubricant from said receptacle to a point adjacent to the bottom of said reservoir.

10. A bearing cooling device comprising a pedestal provided with a reservoir adapted to contain lubricant, a bearing carried by said pedestal above said reservoir, means for conveying lubricant thereto, a receptacle disposed adjacent to said bearing and adapted to collect heated lubricant therefrom, and a pipe communicating with said receptacle and extending to a point adjacent to the bottom of said reservoir adapted to convey the heated lubricant thereto.

11. A bearing cooling device comprising a pedestal provided with a reservoir adapted to contain lubricant, a bearing carried by said pedestal above said reservoir, means for conveying lubricant thereto, a receptacle disposed adjacent to said bearing and adapted to collect heated lubricant therefrom, a pipe communicating with said receptacle and extending to a point adjacent to the bottom of said reservoir adapted to convey the heated lubricant thereto, and a gravity-actuated lubricant-circulating radiator mounted on said pedestal and in communication with said reservoir adapted to cool the lubricant therein.

12. A bearing-cooling device comprising a pedestal provided with a reservoir adapted to contain lubricant, a bearing carried by said pedestal above said reservoir, means for conveying lubricant thereto, a receptacle disposed adjacent to said bearing and adapted to collect heated lubricant therefrom, and a gravity-actuated lubricant-circulating radiator having one end connected to a point near the top of said reservoir and the other end connected to said receptacle.

13. A bearing cooling device comprising a bearing, an oil reservoir below said bearing, means for conveying oil from the top of said reservoir to said bearing, means for conveying heated oil from said bearing to the bottom of said reservoir, and an air-cooled radiator in communication with said reservoir adapted to cool the heated oil contained therein.

In testimony whereof, I have hereunto subscribed my name this 2nd day of February, 1922.

ROY A. McCARTY.